Dec. 27, 1949     S. C. CORONITI     2,492,685
CONTROL CIRCUIT
Original Filed July 28, 1943     2 Sheets—Sheet 1
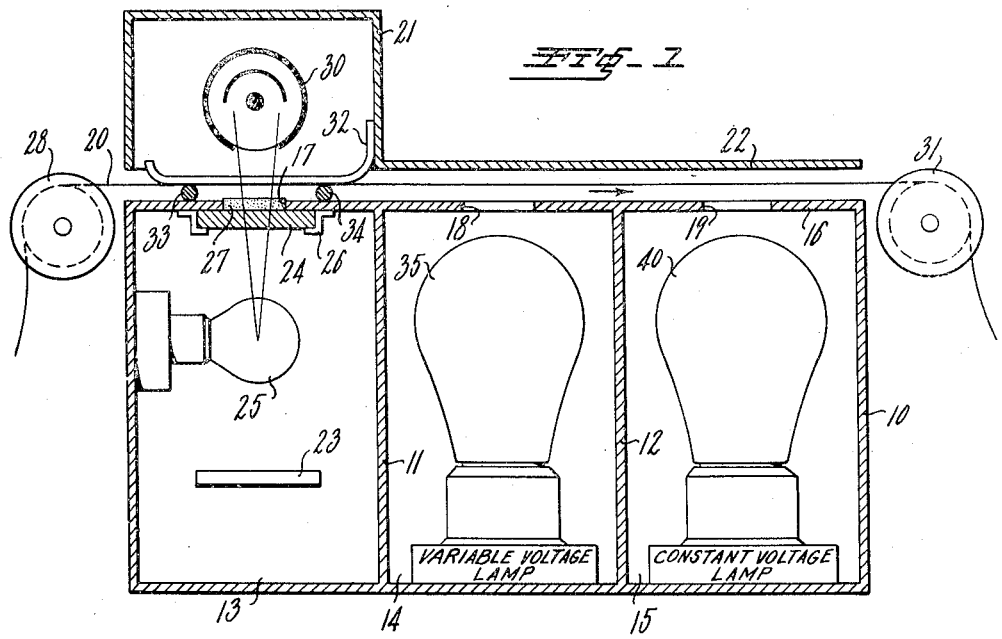
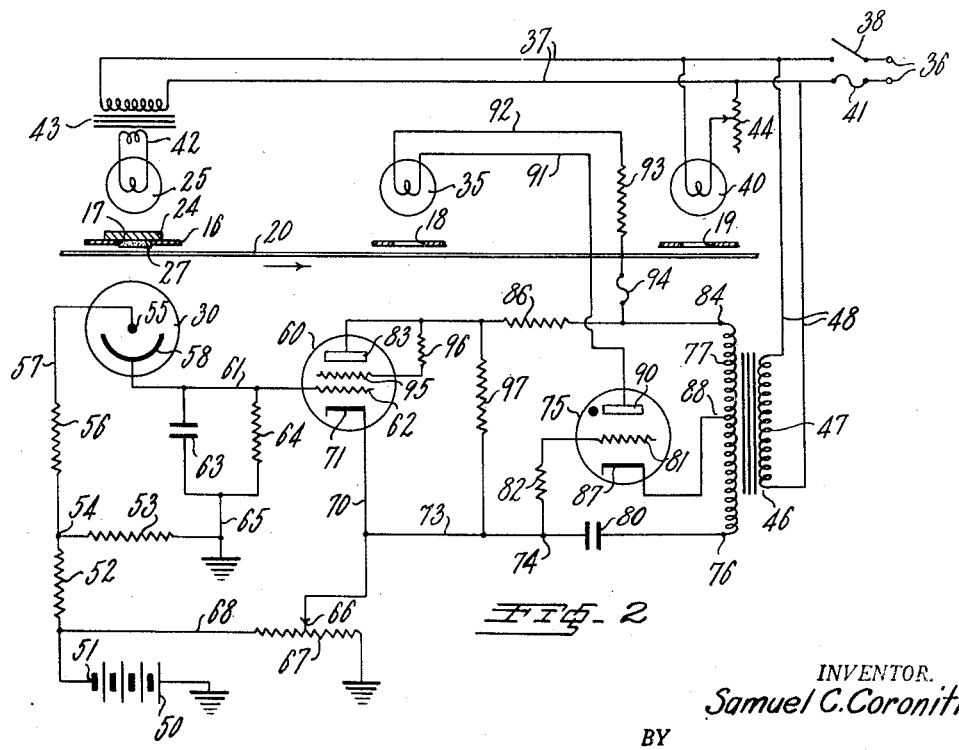
INVENTOR.
Samuel C. Coroniti
BY
Henry W. Coughlin
ATTORNEY Dec. 27, 1949 S. C. CORONITI 2,492,685
CONTROL CIRCUIT
Original Filed July 28, 1943 2 Sheets-Sheet 2

INVENTOR.
Samuel C. Coroniti
BY
Henry W. Coughlin
ATTORNEY

Patented Dec. 27, 1949

2,492,685

UNITED STATES PATENT OFFICE 2,492,685

CONTROL CIRCUIT

Samuel C. Coroniti, Johnson City, N. Y., assignor to General Aniline & Film Corporation, New York, N. Y., a corporation of Delaware Original application July 28, 1943, Serial No. 496,383. Divided and this application June 7, 1944, Serial No. 539,045

4 Claims. (Cl. 250—27)

1

This invention relates to electronic control circuits, and more particularly to a control circuit for varying the output of an electronic discharge tube in accordance with the value of a given condition. The present application is a division of my copending application Serial No. 496,383 filed July 28, 1943, and issued December 24, 1946, as Patent No. 2,413,218 for "Photographic apparatus and control circuit," and assigned to the assignee of the present invention.

While the invention is of general applicability, it finds particular use in photographic apparatus. A particular application of the principles of the invention is to control the second exposure of a photographic film, such as a moving picture film. Hence, for purposes of illustration only, the invention will be described more particularly with reference to its use in a second exposure control apparatus.

In a continuous process for treating motion picture film, the latent image, produced on a film exposed in a camera, is developed into a silver image, producing a negative print. The silver image is then removed, and the film is cleared of residual salts, thereby being again rendered sensitive to light. The image is then examined, and the film is subjected to a controlled printing light, redeveloped and fixed to bring out a positive image. In this process, both the negative and the positive prints are formed on the original film.

It is among the objects of this invention to provide an electronic control circuit effective to control the output of an electronic discharge tube in accordance with the value of a given condition; to provide a control circuit for an electronic discharge tube in which the average current output of the tube is varied by varying the phase relation between the grid voltage and the anode voltage; to provide means for controlling the output of an electronic discharge tube by impressing voltages of substantially the same magnitude on the grid and anode and varying the relative phase relation of such voltages to control the average current output of the tube; to provide a control circuit for varying the average current output of an electronic discharge tube, in which electronic means are provided for varying the phase relation between the grid and anode voltages of said tube to control the current output thereof; to provide such control circuit, including a condition responsive element for varying the internal resistance of electronic means included in the grid voltage supply circuit of the tube to vary the phase of the grid voltage with

2 respect to the anode voltage, applied to the tube, to control the average current output of the tube; to provide an electronic control circuit for varying the average current output of an electronic tube in accordance with the value of a given condition, and including time delay means for delaying the response of the control system with respect to variations in such given condition; and to provide an improved electronic control circuit.

These and other objects, advantages and features of the invention will be apparent from the following description and accompanying drawings. In the drawings:

Fig. 1 is a vertical sectional view through photographic apparatus with which the control circuit of the invention is adapted to be used.

Fig. 2 is a diagrammatic representation of the apparatus shown in Fig. 1, and the control circuit of the invention.

Figure 3:
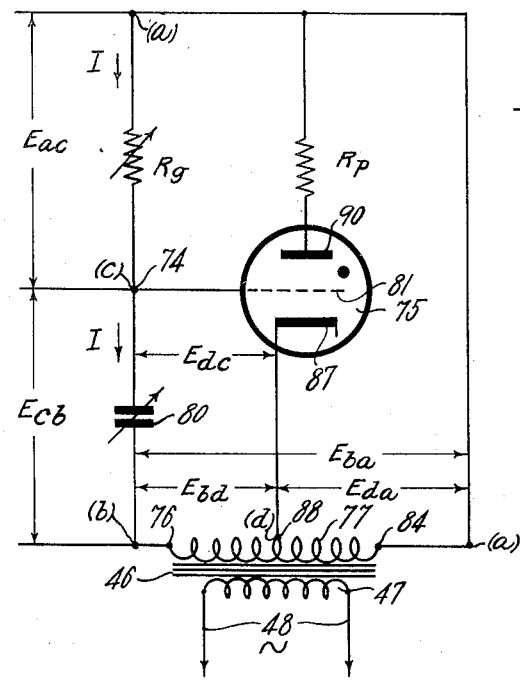
Fig. 3 is a simplified electrical diagram of the fundamental components of the control circuit.

In accordance with the present invention, substantially equal magnitude potentials are applied to the anode and grid circuits of an electronic discharge tube, from a common reference source of alternating current. A resistance and a capacitance are included in the grid voltage circuit, and means are provided for varying the relative values of such resistance and capacitance to vary the phase of the grid voltage with respect to the phase of the anode or plate voltage. Such variation determines the portion of each cycle of alternating current during which the tube is activated to supply current to the load. Preferably, the resistance in the grid circuit comprises an electronic tube whose internal resistance is varied by suitable variation in the grid bias of the tube. The grid bias of this last-named electronic tube is controlled in accordance with the value of a given condition, and time delay means are provided for delaying the response of the control circuit to changes in the value of the given condition for a predetermined interval. While the electronic control circuit is of general application, it will, for purposes of illustration, be described as applied to controlling the second exposure of a photographic film, and as described in my said original application. However, it should be understood that such embodiment of the principles of the invention is exemplary only, and that the invention is not limited thereto.

Generally speaking, in applying the principles of the present invention to such photographic apparatus, a film which has been exposed in a camera and then developed, fixed and bleached, is moved longitudinally past an element effective to measure the optical density of the film. After passing this element, the film is moved past a variable intensity light source. The optical density measuring element, through the electronic control circuit of the invention, controls the intensity of the variable intensity light source. Means are provided in the control circuit for delaying the effect of the measuring element on the variable intensity light source for a sufficient period of time to permit the film to travel from a point adjacent the measuring element to a point adjacent the variable intensity light source.

Referring to Fig. 1 of the drawings, the illustrated photographic apparatus includes a light proof housing 10 subdivided by partitions 11 and 12 into compartments 13, 14 and 15. An intermediate wall 16 of the housing 10 is formed with three apertures 17, 18 and 19, each disposed centrally of one of the compartments 13, 14 and 15. Housing 10 is formed with an extension 21 opposite the compartment 13 and with an outer wall 22 spaced from the wall 16. Walls 16 and 22 form a tunnel through which passes the film 20 which is to be given a second exposure.

A relatively small constant voltage lamp 25 is mounted in housing 13. The light from lamp 25 is directed by a mirror 23 through aperture 17 upon a photoelectric cell 30 mounted in extension 21. The particular photoelectric cell illustrated is responsive to far red and infra red rays, and has a substantially linear response to such rays. A red light filter 24 is mounted in brackets 26 adjacent aperture 17 and a Matte base 27 is inserted in aperture 17. Through the control circuit shown in Fig. 2, photoelectric cell 30 controls the illumination of a variable voltage lamp 35 mounted in compartment 14, and which is adapted to give a variable intensity exposure to film 20 through aperture 18. If desired a constant voltage lamp 40 may be mounted in compartment 15 to give a constant intensity exposure to film 20 through aperture 19. The control of these lamps will be described more fully hereinafter.

The film 20 travels in the direction of the arrow shown in Fig. 1. The film first passes over a roller 28 and then between walls 16 and 22. At the opposite end of the housing, film 20 is threaded over a second roller 31. The film is maintained in constant spaced relation with respect to light 25 and photoelectric cell 30 by means of a guide bracket 32 which presses the film against spaced rollers 33, 34 as the film passes aperture 17.

The operation of the control circuit of the invention, as incorporated in the described apparatus, will be apparent from a consideration of Fig. 2. In this figure, the elements shown in Fig. 1 have been given the same reference characters. Before passing through the apparatus of the invention, film 20 will have been exposed in a camera, developed and fixed to form a negative image, and then bleached before reaching the roll 28. It then passes in front of aperture 17 at which point light rays from lamp 25 pass through filter 24 and base 27 on to photoelectric cell 30. Through the control circuit shown in Fig. 2, the operation of which will be described more fully, photoelectric cell 30 controls the intensity of ilumination of variable intensity lamp 35. Thus, as film 20 passes aperture 18, it receives an exposure from lamp 35 which is a function of the optical density of the film as measured by photoelectric cell 30. Generally, the intensity of the second exposure given by lamp 35 should be an inverse logarithmic function of the optical density of the film as measured by photoelectric cell 30 for reasons apparent to those skilled in the art. The control circuit includes means for delaying the response of lamp 35 to the measurements of photoelectric cell 30 for a period of time sufficient for a given point on the film to move from aperture 17 to aperture 18.

After passing aperture 18, film 20 may be given a constant predetermined basic exposure at aperture 19 from constant intensity lamp 40, if desired. The film then passes over roller 31, after which it is again developed, fixed and washed to form a positive image on the film. Subsequent to such treatment, the film may be examined in any well known manner and is then ready for use in a projector.

Referring to the control circuit shown in Fig. 2, lamps 25, 35 and 40 are energized from a suitable reference source of alternating current 36 which is connected to conductors 37 through a switch 38 and a fuse 41. Lamp 25 is operated at a lesser voltage than lamps 35 and 40. It is therefore connected to the secondary winding 42 of a stepdown transformer 43 connected to conductors 37. The energization of variable intensity lamp 35 is controlled by the photoelectric cell 30 through electronic control circuit of the invention. Constant intensity lamp 40 is connected across conductors 37 and has a variable resistor 44 in series therewith, so that the predetermined basic intensity of lamp 40 may be selected to give a desired basic exposure to film 20.

Alternating current energy for the control circuit is derived from a transformer 46 having a primary winding 47 connected by conductors 48 to conductors 37. A substantially constant direct current potential for the control circuit is supplied by any suitable source of direct current. While a battery 50 has been indicated, it will be understood that the direct current energy may be obtained from alternating current source 36 through a suitable rectifier, with the use of filters and a voltage regulator. Positive terminal 51 of direct current source 50 is connected in series with a voltage divider comprising fixed resistances 52 and 53. From the junction 54 of these resistances, a voltage is applied to anode 55 of photoelectric cell 30 through a resistor 56, and a conductor 57.

Cathode 58 of photoelectric cell 30 is connected by conductor 61 to control grid 62 of a thermionic amplifier or control tube 60. For a purpose to be described, a condenser 63 and a resistance 64 are connected to conductor 61 in parallel with each other. The opposite ends of condenser 63 and resistor 64 are connected by a conductor 65 to ground. A suitable bias voltage for grid 62 of tube 60 is derived from the adjustable terminal 66 of resistor or potentiometer 67, connected by a conductor 68 to positive terminal 51 of direct current source 59, through conductor 70.

The anode-cathode circuit of amplifier tube 60 is connected to the grid circuit of a grid controlled gaseous space discharge tube 75, such as a thyratron tube. In a manner to be described, amplifier tube 60 is effective in varying the phase relation of the voltages applied to the grid and plate, respectively, of discharge tube 75. A conductor 73 connects cathode 71 of tube 60 to a junction point 74. One terminal 76 of the secondary winding 77 of transformer 47 is connected to junction point 74 through a fixed condenser 80. The igniting or grid electrode 81 of tube 75 is connected to junction point 74 through a grid current limiting resistor 82. The anode or plate 83 of thermionic amplifier 60 is connected to the opposite terminal 84 of secondary winding 77 through a load resistance 86.

The cathode 87 of thyratron tube 75 is connected to the mid point 88 of secondary winding 77. Plate 90 of tube 75 is connected by a conductor 91 to one terminal of lamp 35. The opposite terminal of lamp 35 is connected through conductor 92, fixed resistance 93 and fuse 94 to terminal 84 of secondary winding 77. For a purpose to be described, the screen grid electrode 95 of amplifier tube 60 is connected through a limiting resistor 96 to plate 83, and a fixed resistor 97 is connected across the output of amplifier 60.

From the above description of the circuit, it will be observed that the control tube 60 derives its operating anode potential from the charging current of the condenser 80 at operating half cycles when the terminal 84 is positive with respect to the terminal 76 of the winding 77. In effect, the load resistance 86 and the fixed resistor 97, together with the condenser 80 form a voltage divider across the alternating current source represented here by the secondary winding 77 of the transformer 46. At inoperative half cycles when the terminal 84 is negative with respect to the terminal 76 of the winding 77, the discharge or reverse current of the condenser finds a path through the resistors 97 and 86. The control tube 60 is, of course, non-conductive at such periods.

The operation of the circuit illustrated in Fig. 2 is effective to vary the illumination of lamp 35 in accordance with the value of a given condition, such as the amount of light falling on photoelectric cell 30 from lamp 25 as film 20 passes aperture 17. It will be noted that the voltage applied to igniting grid electrode 81 of discharge tube 75 is derived from junction point 74. Junction point 74 is the connecting point between amplifier tube 60 and condenser 80, which are thus connected in series with the secondary winding 77 of transformer 46. The internal resistance of amplifier tube 60 is dependent upon the voltage applied to its grid electrode 62. Thus, with condenser 80 being relatively fixed, variations in the voltage applied to grid 62 will vary the internal resistance of amplifier tube 60. This, in turn, will vary the phase of the voltage applied to grid 81 with respect to the voltage applied to plate 90 of thyratron 75. The plate voltage is derived from the same alternating current reference source as is the grid voltage.

The voltage across secondary winding 77 is the vector sum of the voltages across amplifier tube 60 and condenser 80. The alternating voltage between the grid and the cathode of thyratron 75 is constant in magnitude as will be made apparent hereinafter. However, the phase relation of the grid to cathode voltage with respect to the output voltage of tube 75 is controlled by the condenser 80 and amplifier tube 60. By varying the effective conductivity of amplifier 60, the phase relation of the igniting of grid electrode voltage of discharge tube 75 with respect to the plate voltage thereof is changed. The thyratron 75 is thus made to fire at a point during each cycle of applied plate voltage when the instantaneous value of the igniting electrode voltage exceeds the critical firing value. The firing of tube 75 is thus made dependent on the phase relation between its applied grid cathode, or input voltage, and its applied plate to cathode, or output voltage.

The internal resistance and thereby the effective conductivity of tube 60 is a function of the amount of light reaching photoelectric cell 30. As the amount of light falling on cell 30 increases, for instance, the current flow through anode resistor 56 increases. This increases the voltage drop across resistor 56, and thus varies the voltage applied to grid electrode 62 of amplifier tube 60. The internal resistance of tube 60 is thus made dependent on the amount of light reaching photoelectric cell 30. As mentioned above, the output of tube 60, or correspondingly its effective resistance as applied to the input circuit of tube 75, varies the relative phase relation between the input and output voltages of thyratron tube 75. This in turn determines during what portion of each operating half cycle of applied plate voltage tube 75 will be conductive. As lamp 35 is in series with the output of tube 75, its average intensity of illumination is accordingly controlled as a function of the effective resistance of amplifier tube 60. This action is described in detail hereinafter with reference to Figs. 3, 4 and 5.

By selection of an amplifier tube 60 with suitable characteristics, and by design of the parameters of the circuits of tube 60, the response of lamp 35 to the control exerted by photoelectric cell 30 may be made to bear any desired relation. As stated above, in the present instance, the intensity of illumination of lamp 35 is designed to vary inversely, and as a logarithmic function of the optical density of film 20.

The variation of the parameters of the circuits of amplifier 60 may be accomplished in any desired manner. In one practical embodiment of the invention, a pentode of the type "6F6" has been used satisfactorily as amplifier tube 60. The design of the parameters of the circuits of tube 60 is improved by the use of the screen grid resistor 96 and shunt resistor 97 connected across the output of tube 60. In the described embodiment, with the use of a red light filter 24, a red light responsive photoelectric cell 30 having a linear response, and a pentode for amplifier 60, the circuit parameters necessary to produce proper control of lamp 35 are effectively obtained in practice.

One other criterion is taken into consideration in the operation of the illustrated apparatus. It takes a small interval of time for a given point on film 20 to move from adjacent aperture 17 to adjacent aperture 18. The imposition of the control signal from photoelectric cell 30 on the control circuit is delayed for this interval. This is accomplished by a time delay circuit including condenser 63 and resistance 64 which are connected in parallel with the control grid 62 of amplifier tube 60 and photoelectric cell 30. By proper selection of the relative sizes of condenser 63 and resistance 64, the proper time delay in the impression of the control signal from photoelectric cell 30 on the control grid 62 of tube 60 is obtained.

Figure 4:
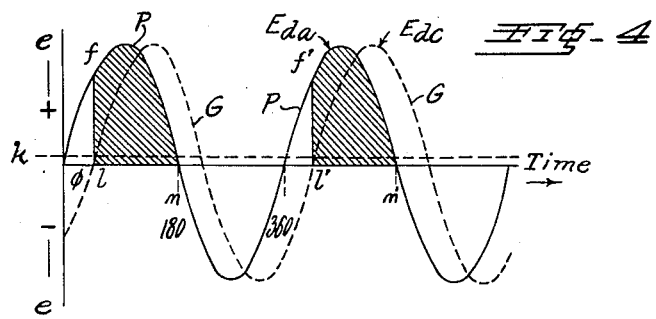
Fig. 4 is a set of curves illustrating voltage relations of the circuit of Fig. 3.
Figure 5:
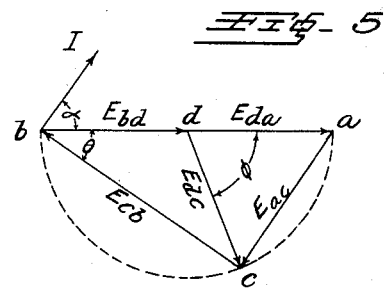
Fig. 5 is a vector diagram of the current and voltages of the circuit of Fig. 3.

Figs. 3, 4 and 5 diagrammatically illustrate the general principles underlying the electronic control circuit of the present invention. The control circuit in a simplified form is illustrated in Fig. 3. For reference, the points of differing potential, such as the terminals of winding 77 of transformer 46, junction point 74 and mid-point 88 of winding 77 have been also designated with the letters a, b, c, and d, respectively. Variable intensity lamp 35 is represented by resistance $R_p$ and the output effect of amplifier 60 by variable resistance $R_g$. Also, the potential differences between the respective points have been designated $E_{da}$, $E_{bd}$, $E_{dc}$ and $E_{ac}$.

In Fig. 4 are curves illustrating the operation of the circuit through two cycles. The grid voltage $E_{dc}$ is represented by the broken line curve G. The output voltage of tube 75 is represented by the solid line curve P. In the instant illustration, the grid voltage G lags the plate or output voltage P by $\phi$ electrical degrees. The grid voltage G must obtain a certain critical value K before tube 75 can become conductive or fire. As shown in Fig. 4, the plate voltage obtained the positive potential $lf$ at the time the grid attains its critical potential K and tube 75 starts to fire. Tube 75 continues to fire for the rest of the positive half cycle, to point M. Tube 75 remains nonconducting until its plate voltage P reaches the value $l'f'$, when the grid voltage G again reaches the magnitude $k$. The tube 75 will again become conductive and remain conductive for the remaining half cycle to point M'.

The conducting time $lm$ of tube 75 may be made smaller or larger by varying the electrical phase displacement $\phi$ of the grid voltage G with respect to the plate voltage P. In Fig. 4, this would be represented by shifting curve G to the right or the left with respect to curve P. The maximum time for conduction of tube 75 is practically for a complete half cycle or about 180°. Thus, by varying the phase difference between the plate and grid voltages of tube 75, the amount of time during which tube 75 is conductive is correspondingly varied.

Fig. 5 is a vector diagram of the relation of phase angle $\phi$ and the grid and plate voltages $E_{dc}$ and $E_{da}$. The current I flowing through the resistance $R_g$ and condenser 80 here leads the voltage $E_{ba}$ across transformer winding 77 by an angle $\alpha$. The voltage drop $E_{ac}$ across resistance $R_g$ is in phase with current I. The voltage $E_{cb}$ across condenser 80 lags 90° with respect to current I. The vector sum of the voltages $E_{ac}$ and $E_{cb}$ is equal to the total voltage $E_{da}$ of the secondary 77 of transformer 46. This relation holds for all conditions. The vectors $E_{cb}$ and $E_{ac}$ make a right angle with each other for all values of the angle $\alpha$. Hence the locus of point c for all values of $\alpha$ from zero to 90° will be a semi-circle with fixed vector $E_{ba}$ as diameter.

The voltage between grid 81 and the cathode 87 of tube 75 is represented by the vector $E_{dc}$ which is a radius of such circle. Since the voltages $E_{bd}$ and $E_{da}$ are one-half of $E_{ba}$, the magnitude of vector $E_{dc}$ is equal to that of $E_{bd}$ and $E_{da}$. Vector $E_{dc}$ is thus constant in magnitude for all such values of $\alpha$. Movement of vector $E_{dc}$ in either a clockwise or a counter clockwise direction will vary the relative magnitudes of the vectors $E_{bc}$ and $E_{ca}$, and likewise, the phase angle $\phi$ between the plate voltage $E_{da}$ and grid voltage $E_{dc}$. It will be apparent that either the voltage across the condenser 80 or that across the resistance $R_g$ can be varied from zero to the respective full values of the transformer secondary voltage $E_{ba}$; and the phase angle $\phi$ thus varied from 0° to 180°.

Referring again to Fig. 3, either resistance $R_g$ may be held constant and condenser 80 varied, or vice versa, to vary the phase relation $\phi$ of the grid or input voltage of tube 75 with respect to the plate or output voltage thereof. As pointed out in connection with Fig. 4, this correspondingly varies the time interval during which tube 75 is conductive. In practice, either resistance $R_g$ or condenser 80, or both, may be varied manually, mechanically, electronically or automatically. In the illustrated embodiment condenser 80 is held constant, and resistance $R_g$ is electronically varied by amplifier tube 60. In turn, tube 60 is herein automatically controlled by photoelectric cell 30.

Variations in the conductivity or internal resistance of amplifier tube 60 as controlled by amount of light reaching photoelectric cell 30 will vary the phase relationship $\phi$ of the voltage applied to grid 81 of tube 75 with respect to the voltage applied to plate 90 thereof.

While a particular application of the control circuit including the time delay circuit comprising condenser 63 and resistance 64, amplifier tube 60, discharge tube 75, condenser 80, and the load comprising lamp 35 has been described to illustrate the principles of the invention, the circuit is of general application. That is, it may be used otherwise than in the specific case illustrated in the drawings. It should therefore be understood that while a specific embodiment of the invention has been shown and described, to illustrate how the principles of the invention may be applied, the invention is not limited thereto, but may be otherwise embodied without departing from the principles thereof.

What I claim is:

1. In a control circuit for gaseous discharge devices having anode, cathode and an igniting electrode, a source of alternating current, circuit means for connecting a portion of said source between said cathode and said anode including in series a load element, a phase shift network comprising a circuit connecting a portion of said source between said igniting electrode and said cathode including a reactive element, and connecting said first mentioned portion of said source between cathode and said igniting electrode including a resistance, a control tube associated with said network having anode, cathode and control electrodes, circuit means for deriving operating anode potential for said tube from said network including said resistance and means associated with the grid electrode of said tube for changing its conductivity and thereby the relative phase-shift of said network.

2. In a control circuit for gaseous discharge devices having anode, cathode and an igniting electrode, a source of alternating current, circuit means for connecting a portion of said source between said cathode and said anode including in series a load element, circuit means for connecting another portion of said source between said igniting electrode and said cathode including a reactive element, circuit means for connecting said first mentioned portion of said source between cathode and said igniting electrode including in series a resistance and the anode and cathode elements of a thermionic control tube whereby said reactive element and said control tube in series are substantially between terminals of said source and means for controlling the effective conductivity of said tube and thereby the relative phase of the voltage applied from said source to said igniting electrode with respect to that applied to another electrode of said device and a current conductive connection between the cathode and the anode of said tube.

3. In a control circuit for gaseous discharge devices having anode, cathode and an igniting electrode, a source of alternating current, circuit means for connecting a portion of said source between said cathode and said anode including in series a load element, circuit means for connecting another portion of said source between said igniting electrode and said cathode including a reactive element, circuit means for connecting said first mentioned portion of said source between cathode and said igniting electrode including in series a resistance and the anode and cathode elements of a thermionic control tube whereby said reactive element and said control tube in series are substantially between terminals of said source and means for controlling the effective conductivity of said device and thereby the relative phase of the voltage applied from said source to said igniting electrode with respect to that applied to the anode of said device and a resistance bridging the anode and cathode electrodes of said tube.

4. In a control circuit for gaseous discharge devices having an anode, a cathode and an igniting electrode, a divided source of alternating current comprising a center tapped secondary winding of a transformer, a connection from the cathode of said device to said center tap, a connection from the anode of said device through a load resistance to one terminal of said winding, a voltage divider between terminals of said winding comprising a resistance element and a condenser in series so proportioned as to form at the junction point of their connection a voltage terminal with respect to said tap which is displaced in phase with respect to the terminals of said winding, a connection from said igniting electrode to said junction point, a control tube having anode, cathode and grid electrodes, a connection from the cathode of said tube to said junction point and a connection from the anode of said tube to a portion of said resistance element, whereby the portion of said resistance element between anode of said tube and one terminal of said winding serves as a load resistance for said tube and the other portion of said resistance between anode and cathode of said tube provides a reverse current path for said condenser, and a control circuit including said grid electrode for changing the effective conductivity of said tube and thereby the relative phase displacement at said junction point.

SAMUEL C. CORONITI.

REFERENCES CITED

The following references are of record in the file of this patent:

UNITED STATES PATENTS

| Number | Name | Date |
|---|---|---|
| 2,005,892 | Gulliksen | June 25, 1935 |
| 2,010,577 | Wilson | Aug. 6, 1935 |
| 2,112,736 | Cockrell | Mar. 29, 1938 |
| 2,156,886 | Vedder | May 2, 1939 |
| 2,269,324 | Turner et al. | Jan. 6, 1942 |
| 2,274,158 | Penther | Feb. 24, 1942 |
| 2,431,158 | Yates | Nov. 18, 1947 |

FOREIGN PATENTS

| Number | Country | Date |
|---|---|---|
| 747,996 | France | Apr. 10, 1933 |

OTHER REFERENCES

Electron Tubes in Industry by Henny, 1st edition, page 362, Figure 89. (Copy in Division 54.)